Nov. 10, 1964   T. E. G. GARDINER ETAL   3,156,298
HEAT SHIELDING FOR DUCTS
Filed Aug. 18, 1960   2 Sheets-Sheet 1
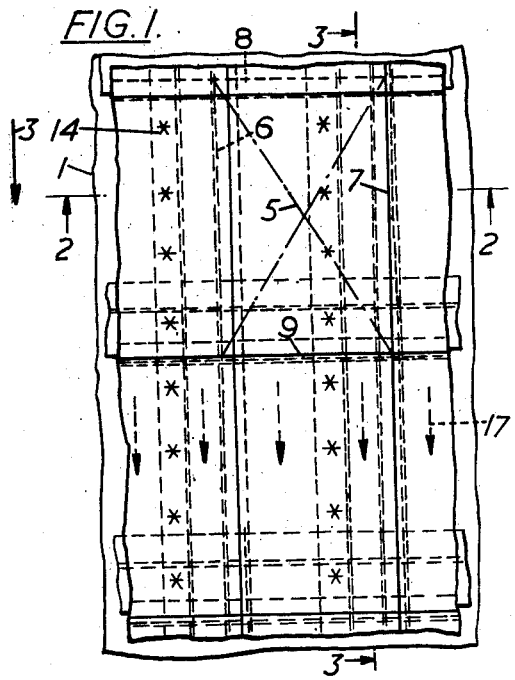
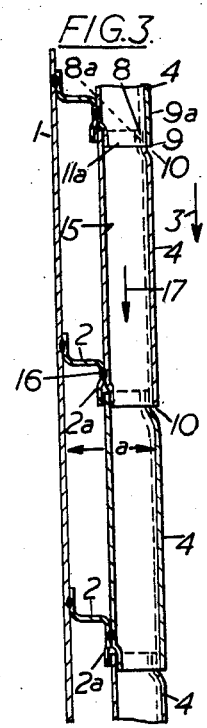
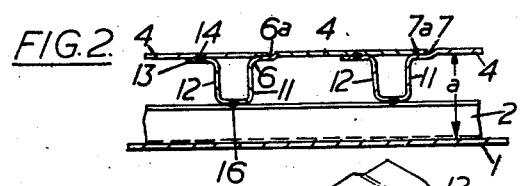
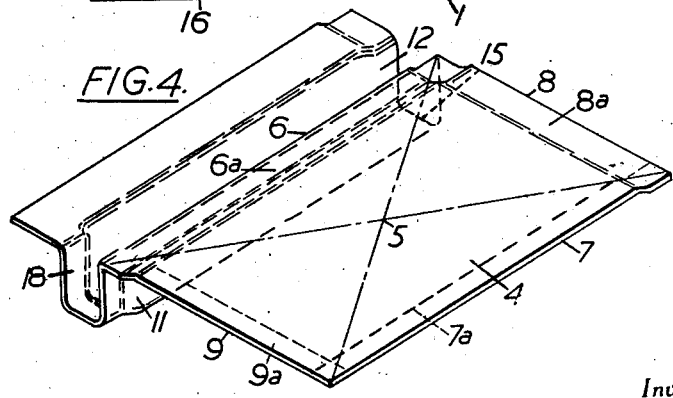
Inventors
TERENCE EDWARD GOUVENOT GARDINER AND
ROBERT GARBUTT
By
Bailey, Stephens & Huettig
Attorneys Nov. 10, 1964 T. E. G. GARDINER ETAL 3,156,298
HEAT SHIELDING FOR DUCTS
Filed Aug. 18, 1960 2 Sheets-Sheet 2
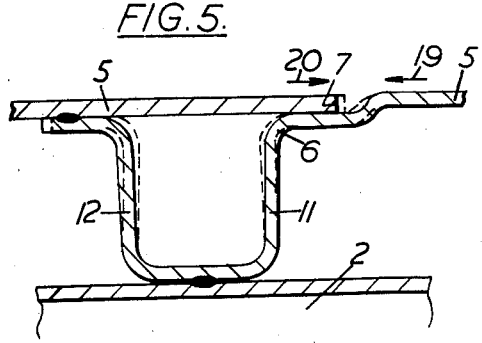
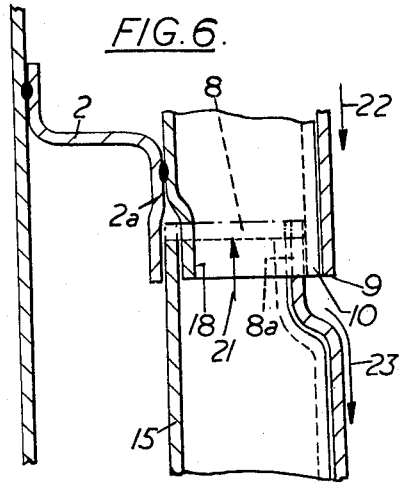
Inventors
TERENCE EDWARD GOUVENOT GARDINER AND
ROBERT GARBUTT
By
Bailey, Stephens & Huettig
Attorneys

3,156,298
HEAT SHIELDING FOR DUCTS

Terence Edward Gouvenôt Gardiner and Robert Garbutt, Bristol, England, assignors to Bristol Siddeley Engines Limited, Bristol, England
Filed Aug. 18, 1960, Ser. No. 50,357
Claims priority, application Great Britain Aug. 18, 1959
1 Claim. (Cl. 165—134)

According to the invention heat shielding for the wall of a hot gas duct comprises an assembly of sheet elements supported on the wall of the duct in inwardly spaced relation thereto, each with a pair of opposite first edges parallel to, and a pair of opposite second edges at right angles to, the direction of flow of gas through the duct, the adjacent first edges of adjacent elements having marginal zones overlapping one another in surface-to-surface slidable contact, the adjacent second edges of adjacent elements having marginal zones overlapping one another in spaced relation to form narrow slits directed downstream, and the elements and the wall defining between them at least one passage through which fluid coolant may flow to and through the narrow slits; and a system of members supporting the elements on the wall but isolating the wall from any significant stresses due to differential thermal expansion between the elements and the wall.

At each overlap, the zone nearer the wall of the duct is preferably joggled towards the wall, so that on the side presented towards the hot gas the surface of the assembly is substantially smooth.

Each element may be made integrally with a support member.

An example of heat shielding according to the invention is shown in the accompanying drawing. In the drawing:

FIGURE 1 shows part of the assembly, looking towards the surface presented towards the hot gas;

FIGURES 2 and 3 are sections taken along the line 2—2 and 3—3 respectively in FIGURE 1;

FIGURE 4 is an isometric view of an element of the assembly; and

FIGURES 5 and 6 are enlargements of parts of FIGURES 2 and 3 respectively.

In FIGURES 1, 2 and 3 a portion of a flat wall of a hot gas duct is shown at 1. This is stiffened by Z-section stringers 2 spaced apart on the hot gas side and extending at right angles to the direction of flow of the hot gas, indicated by an arrow 3. (FIGURES 1 and 3.)

The heat shielding is composed of a number of identical sheet metal elements 4 the extent of one of which is indicated on FIGURES 1 and 4 by the chain dotted diagonal lines 5. The elements are spaced inwardly from the wall 1 a distance $a$ and have a first pair of opposite edges 6, 7 parallel to the flow direction and a second pair of opposite edges 8, 9 at right angles to the flow direction.

The edge 6 of each element and the adjacent edge 7 of the next element have marginal zones 6a and 7a overlapping one another in surface-to-surface slidable contact. To preserve a smooth surface on the side presented towards the hot gas, the marginal zone 6a is joggled towards the duct wall 1 by an amount substantially equal to the thickness of the sheet metal of which the elements are made.

Similarly the edge 8 of each element and the adjacent edge 9 of the next upstream element have marginal zones 8a and 9a overlapping one another, but in this case the zone 8a is joggled towards the wall 1 by an amount in excess of the thickness of the material so that, as shown in FIGURE 3, a narrow slit 10 is formed directed downstream.

Each element is supported on the wall of the duct by two webs 11 and 12, the web 11 being a downwardly flanged extension from the edge 6 of the element and the web 12 being a still further upwardly flanged extension of the same element. Each element thus has, attached to its edge 6, a trough-shaped extension the sides of which constitute webs 11 and 12. The web 12 has a flange 13 which will underlie the next element and can be spot-welded to it on assembly of the shielding as shown at 14. The base 15 of each trough-shaped extension is spot-welded at a position near one end 18 to the inner flange 2a of one of the stringers 2 as shown at 16, and, to prevent the elements tilting out of alignment, the end 18 of the trough is joggled inwardly so that it can enter the trough of the next adjacent element and rest on the bottom 15 of the next trough, this next trough itself resting on an edge part of the flange 2a. Thus the next trough is slidingly guided by the trough end 18 and the flange 2a.

Since the webs 11 and 12 are of sheet metal and extend perpendicularly from the elements 4 to the stringers 2, differential thermal expansion between the elements and the wall, in the direction at right angles to the gas flow, is readily accommodated by bending of the webs and sliding of the elements upon another at their overlapping margins, as shown in broken lines in FIGURE 5, without the transmission into the wall 1 of stresses which would significantly affect either its durability or its shape. Since the webs 11 and 12 are equally flexible, the edges 6 and 7 move equal amounts in opposite directions as indicated by the arrows 19, 20 in FIGURE 5. The amount of such sliding can be kept to acceptable values by making the dimension of the elements transverse to the direction of gas flow sufficiently small. Preferably this dimension does not exceed two and a half inches.

In the direction of gas flow, differential expansions can be taken up by sliding of the joggled ends in the trough ends 18 of adjacent elements, as shown in broken lines in FIGURE 6, since each element is connected to only one stringer. The stringer 2 does not flex, and so the edge 9 remains stationary, all of the movement being at the edge 8, as indicated by the arrow 21 in FIGURE 6.

In operation, a supply of cooling air is caused to flow through the space enclosed between the elements 4 and the wall 1 as indicated by the arrows 17. This air issues through the narrow slits 10 in the form of a thin sheath providing film cooling for the surface of the elements, as indicated by the arrows 22, 23 in FIGURE 6. The spacing between the slits, and therefore the dimension of the elements in the direction of gas flow, is determined by the requirement that the film of cooling air 22 should not break down before the next slit 10 is reached. This is dependent on the pressure differential available, the width of the slit and the temperature of operation and would be of the order of four inches.

As one example, heat shielding according to the present invention is applied to the wall of a combustor duct in a ram-jet engine. The temperature within the duct increases progressively downstream from the end adjacent to the burners to the beginning of the expansion nozzle, starting at about 600° K. and reaching about 1500° K. The cooling air enters the space between the elements at about 600° K., and becomes somewhat heated as it flows downstream while still between the elements, as some heat necessarily passes through the shielding. The width of the slits is increased successively downstream, from 0.01 inch at the cool end to 0.10 inch at the hot end. The pressure drop through the slits is about 1.4 p.s.i.

We claim:
A duct for hot flowing gases comprising a main wall, an assembly of sheet elements, means for supporting each sheet element separately on said wall of the duct in in- wardly spaced relation thereto and for isolating the wall from any significant stresses due to differential thermal expansion between the elements and the wall, each sheet element having a pair of opposite first edges parallel to, and a pair of opposite second edges at right angles to, the direction of flow of gas through the duct, the adjacent first edges of adjacent elements having marginal zones overlapping one another in surface-to-surface slidable contacts, the adjacent second edges of adjacent elements having marginal zones overlapping one another in spaced relation to form narrow slits directed downstream at each overlap, the marginal zone of the second edges nearer the wall of the duct being joggled towards the wall, so that on the side presented towards the hot gas the surface of the assembly is substantially smooth, and the elements and the wall defining between them at least one passage through which fluid coolant may flow to and through the narrow slits, the fluid coolant flowing parallel to and in the same direction as the hot gases.

References Cited in the file of this patent
UNITED STATES PATENTS

| | | |
|---|---|---|
| 1,580,974 | Rembold | Apr. 13, 1926 |
| 2,884,759 | Sevcik | May 5, 1959 |
| 2,974,486 | Edwards | Mar. 14, 1961 |
| 3,061,274 | Hoyden | Oct. 30, 1962 |